Jan. 21, 1958 C. W. DAVIES ET AL 2,820,859
MEANS FOR CONTROLLING OPERATIONS AT VARIABLE INTERVALS
Filed Jan. 11, 1956 2 Sheets-Sheet 1

Inventor
CHARLES W. DAVIES &
LEONARD A. POLLARD
By
Attorney

Jan. 21, 1958  C. W. DAVIES ET AL  2,820,859
MEANS FOR CONTROLLING OPERATIONS AT VARIABLE INTERVALS
Filed Jan. 11, 1956
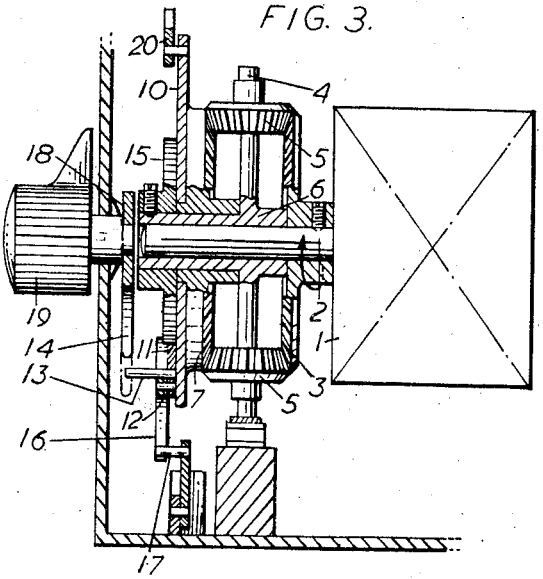
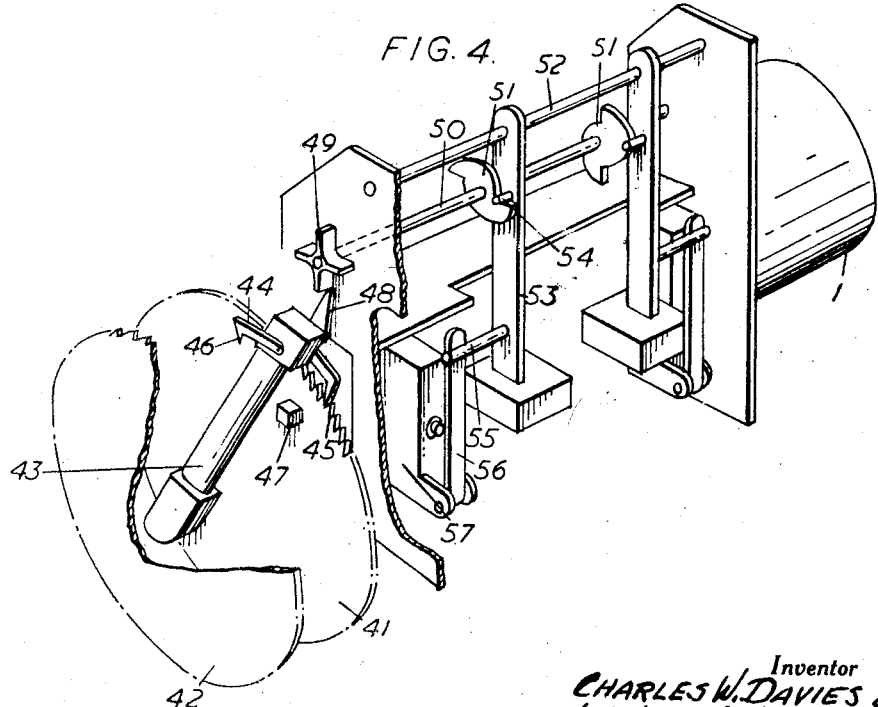
Inventor
CHARLES W. DAVIES &
LEONARD A. POLLARD
By

United States Patent Office 2,820,859
Patented Jan. 21, 1958

2,820,859

MEANS FOR CONTROLLING OPERATIONS AT VARIABLE INTERVALS

Charles William Davies and Leonard Arthur Pollard, East Molesey, England, assignors to Trianco Limited, East Molesey, England Application January 11, 1956, Serial No. 558,579

9 Claims. (Cl. 200—37)

In the operation of various apparatus (as, for example, in the operation of certain apparatus for removing clinker from boiler furnaces) it is required to initiate periodically a sequence of operations whereby one of two or more electrical circuits is selected and thereafter closed (or opened) for example to start a selected motor.

It is an object of the present invention to provide means whereby such selection and consequent switching may be achieved. A further object of the invention is to provide for the selection of the circuit to be achieved prior to but in co-relation with the operation of the circuit closing switch.

Furthermore, it is often required to repeat the initiation of these and other operations at intervals which may be predetermined at the will of an operator, and it is another object of the invention to provide means whereby the interval between successive operations may be varied at will.

Such intervals may each comprise an uninterrupted length of time or may each comprise the sum of a number of time intervals of varying length and the term "intervals" is intended in this specification to include both these types.

Such intervals may be represented by a number of revolutions of a rotary shaft rotated continuously or intermittently. This shaft may be the output shaft of a clock operated synchronously with a machine or apparatus to be controlled or may be driven from the machine or apparatus itself.

From one aspect, the invention provides means for periodically selecting an electrical circuit and subsequently controlling the condition of that circuit comprising a shaft rotatable intermittently step-by-step in one direction by timing means, and means operable at successive operations of the shaft to operate switches successively to select and control electrical circuits. The switch operating means may for example comprise tiltable mechanism tilted in alternative directions at successive operations of the shaft or may comprise pendulum arms caused by the rotation of the shaft to swing into contact with the switches. On each operation of the shaft, two switches may be operated, one to select and one to control the appropriate circuit or one switch may be operated to select the circuit and be maintained in operative position sufficiently long to control the circuit.

From another aspect, means for seelcting and controlling one of two electrical circuits at periodic intervals of variable predetermined length comprises, according to the invention, two pairs of switches, one switch of each pair being operable to select a circuit and the other switch of each pair being operable to control the selected circuit, the two switches of one pair being operated by tilting a member in one direction and the two switches of the other pair being operated by tilting this member in the other direction, said member being tilted successively in opposite directions by a shaft rotated step-by-step in one direction by timing means engaged with said shaft at variable predetermined intervals. In one form, the switches of each pair are formed by balls running in channels in the tilting member and engaging contacts at each end of the channels. Preferably one ball (that controlling the circuit), runs over contact strips during tilting and in the final tilted position runs clear of the strips so that contact is made only for a short interval. This ball is preferably delayed in its movement by arranging that it must run up a ramp before making contact thereby ensuring that the "selecting" switch is made first.

The controlling switch may make the starting contactor of an electric motor which is then held on by its holding coil until the circuit of this is broken for example after the motor has run for a predetermined number of revolutions.

From yet another aspect, means for selecting and controlling electrical circuits at periodic intervals of variable predetermined length comprises according to the invention, a shaft intermittently rotated step-by-step in one direction by timing means engaged with the shaft at variable predetermined intervals, cams spaced along the shaft and angularly displaced relatively to one another by the angle through which the shaft rotates at each step, and pendulum arms engaging these cams, moved away from switches on rotation of the shaft and allowed to swing into contact with the switches and operate them as the shaft comes to rest. The pendulum arms strike levers operating the switches which are flexible so that the switches are maintained operated sufficiently long to operate a solenoid starter switch or the like.

The timing mechanism may drive a disc or arm carrying a member engaging a star wheel on the rotary shaft at a predetermined angular position and the disc or arm is preferably driven alternately clockwise and anticlockwise so that the time between successive engagements of the star wheel may be varied by varying the arc through which the disc rotates between reversals in direction of rotation.

The timing mechanism may be of any suitable form but there is preferably used a form of timing mechanism which in itself forms a feature of the invention.

From another aspect therefore the invention provides a timing mechanism in which a shaft rotating unidirectionally moves a switch operating arm from one angular position to a second position and returns it to the first position during which movement the arm operates a switch the relative angular displacement of these two positions being adjustable whereby the number of revolutions of the shaft between successive operations of the switch is varied.

From yet another aspect, a timing mechanism according to the invention comprises a switch operating arm rotated in one direction, from a unidirectionally rotating shaft through a differential mechanism of which the carrier is frictionally held against rotation, until the arm engages a first means operable to lock the arm to the carrier of the differential and thereby reverse the direction of rotation of the arm, the arm being rotated in this reverse direction until it engages a second means operable to free the arm and again reverse its direction of rotation, the relative angular displacement of these first and second means being adjustable to predetermine the number of revolutions of the shaft required to bring the arm successively to a predetermined position at which it operates a switch.

From yet another aspect, a timing mechanism according to the invention comprises a switch operating arm fixed to one sun wheel of a differential mechanism of which the other sun wheel is in driving connection with a unidirectionally rotating shaft and the carrier is held frictionally against rotation, two stops angularly displaced relatively to one another means for varying the angular displacement of these stops, means carried by the switch arm adapted to be engaged by one of these stops and operable to lock the carrier of the differential to a sun wheel so that the differential rotates as a whole driving the arm in one direction and means carried by the arm adapted to be engaged by the other stop to free the carrier from the sun wheel whereby the operating arm is rotated in the reverse direction.

At any convenient point in its travel from one stop to the other and back again, the arm engages the operating mechanism of a switch which is thus operated at intervals determined by the relative angular displacement of the two stops.

The arm may operate an electrical switch or may operate a valve controlling a pneumatic or an hydraulic system or might trigger a mechanical linkage. The term switch is used in this specification to include all such arrangements.

Preferably one of the stops is stationary whilst the other is mounted on an arm manually rotatable about the axis of the switch operating arm to vary the angular displacement between the two stops.

The means to lock the carrier to the switch operating arm may comprise a pawl member carried by the switch operating arm and moved into or out of engagement with a toothed wheel fixed to the carrier by contact with one or other of the stops.

Other parts of the invention are embodied in the preferred forms which will now be described in some detail by way of example with reference to the accompanying drawings in which:

Fig. 3 is a section through the timing device shown in Fig. 1; and

Fig. 4 is a perspective view of another form.

These forms will for convenience be described in relation to their use in the operation of a boiler furnace supplied with forced draught by a fan. Certain auxiliary apparatus of this boiler is required to be operated after the fan has been running in total for a predetermined time since the previous operation of the auxiliary apparatus and it is desirable that this predetermined time should be capable of variation under control of the operator.

Figure 1:
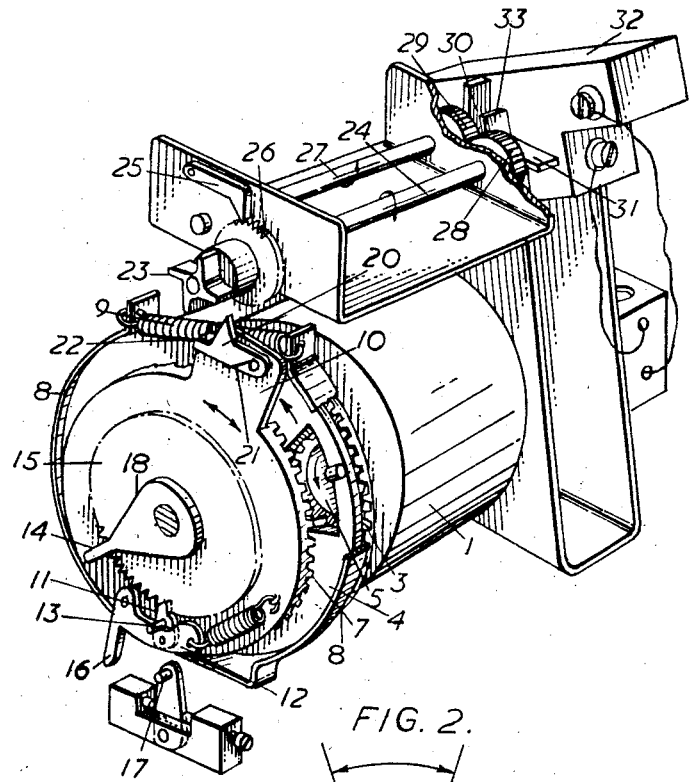
Fig. 1 is a perspective view of one form.
Figure 2:
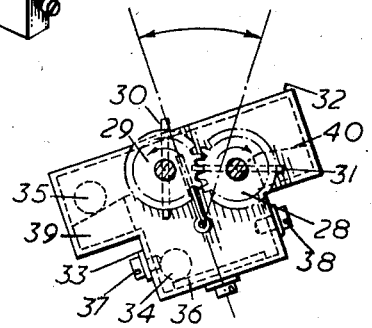
Fig. 2 is a section through switch mechanism shown in Fig. 1.

Referring first to Figs. 1 to 3, a time clock 1 running in parallel with the fan motor drives a rotary output shaft 2 in the counter-clockwise direction so that the number of revolutions of this shaft represents the time for which the fan has been running. Fixed co-axially on this shaft 2 is a bevel wheel 3 forming one sun wheel of a differential mechanism.

A carrier disc 4, carrying a number of planet wheels 5 in mesh with the sun wheel 3 is mounted on a hollow shaft 6 co-axial with the rotary shaft 2 and rotatable in relation thereto. The other sun wheel 7 of the differential is mounted to rotate on the hollow shaft 6 and is also in mesh with the planet wheels 5.

The carrier 4 is normally prevented from rotation by the friction clutch shoes 8 pressed against the periphery of the carrier by a tension spring 9 and the second sun wheel then rotates in the clockwise direction.

A switch operating arm 10 is fixed to the second sun wheel 7 and rotates therewith. On the switch operating arm is mounted a pawl 11 pivoted to a pawl carrier 12 which is pivoted to the arm 10. Projecting from the pawl 11 is a pin 13 which, as the arm rotates in a clockwise direction, abuts against a stop 14 and is thereby moved into engagement with a toothed wheel 15 rigidly mounted co-axially on the hollow shaft 6 of the carrier disc 4. Such engagement locks the switch operating arm 10 (and the sun wheel 7 to which it is fixed) to the carrier disc 4 so that the differential rotates as a whole in the counter-clockwise direction, the carrier 4 slipping relatively to the clutch shoes 8. The direction of movement of the operating arm is thus reversed.

Rotation of the switch operating arm 10 in the counter-clockwise direction brings a tail 16 on the pawl carrier 12 into contact with a stationary stop 17 which swings the pawl carrier 12 about its pivot and disengages the pawl 11 from the toothed wheel 15. This frees the switch operating arm 10 from the carrier 4 of the differential and it is again rotated in a clockwise direction.

The stop 14 against which the pawl 11 engages during clockwise movement of the operating arm 10 is mounted on an arm 18 co-axial with the axis of the switch operating arm, and may be rotated about this axis by a knob 19 under control of the operator. The angular displacement between this stop and the fixed, disengaging stop can thus be set at any desired angle between almost zero and almost 360°. The operating arm moves over this angle in both clockwise and counter-clockwise direction.

At any convenient point in this to and fro movement of the switch operating arm 10, preferably just before the toothed wheel 15 is disengaged by the pawl 11, the switch operating arm 10 operates a suitable type of switch.

A ratchet lever 20 pivoted to the operating arm 10 and pressed outwardly by a spring 21 against a stop 22 engages a 4-toothed star wheel 23 to rotate a shaft 24 when the operating arm 10 rotates counter-clockwise. On reverse rotation this lever 20 is pushed inwardly sliding over the tooth of the star wheel 23 the shaft 24 being held against reverse rotation by a holding pawl 25 and ratchet wheel 26. A second parallel shaft 27 is geared to this first shaft by gearing 28, 29 of one-to-one ratio.

On the end of each shaft 24, 27 is a blade, the two blades 30, 31 being at 90° to one another.

A switch case 32 is mounted to tilt about an axis parallel to the axes of the two shafts 24, 27 and a blade 33 fixed to the switch case 32 extends between the two blades 30, 31 on the shafts. As the star wheel 23 is rotated tooth by tooth, the blades 30, 31 on the shafts engage in turn with the blade 33 on the switch case and tilt this first to one side and then to the other.

Within the switch case 32 (see Fig. 2) are two balls 34, 35 each of which rolls from one side of the case to the other when the case is tilted. One ball 34 runs along a conductive strip 36 and makes contact at either end with a stud 37 or 38 to close an electrical circuit which selects (according as the switch is tilted to one side or the other) which of two motors is to be started. The other ball 35 shorts across a pair of contacting strips 39 (only one being shown in Fig. 2) makes the circuit of a starter switch solenoid for a motor, and runs off these strips immediately to break the circuit in readiness for the next cycle of operations, the starter switch being held closed by its own control circuit. This second ball 35 is momentarily withheld by an upwardly directed ramp 40 so that its movement is delayed relatively to that of the first ball 34, thereby ensuring that the desired circuit is selected before the starter switch circuit is made. It will be seen that the switch is operated periodically at intervals determined by the position of the stop 14 which causes the switch operating arm 10 to be locked to the carrier of the differential and these intervals can be varied by the operator merely by turning the control knob 19. In one arrangement the intervals can be altered in length from 15 minutes up to 12 hours by means of the knob. Shorter or longer periods can be obtained by increasing or decreasing the speed of the driving motor of the clock, and/or by varying the diameter of and number of teeth on the toothed wheel.

It will be understood that other types of switches might be used such as mercury switches, or micro switches.

In the form shown in Fig. 4, timing mechanism of a known kind is shown diagrammatically though it will be understood that the timing mechanism shown in Figs. 1 and 2 or any other suitable timing mechanism may be used. In the type indicated, the two sun wheels 41, 42 are interconnected by gearing so that they are continuously rotated in opposite directions by the output shaft of a time clock 1. An operating arm 43 is movable about the axis of the wheels 41, 42 and carries a pivoted lever 44 having teeth 45, 46 at either end. In one position of the lever 44, the tooth 45 engages teeth on the wheel 41 and locks the operating arm 43 to the wheel 41 to rotate in one direction. In the other position of the lever 44, the tooth 46 engages teeth on the wheel 42 and locks the operating arm 43 to the wheel 41 to rotate in the other direction. The pivoted lever is moved from one position to the other by engagement with one or other of two stops such as 47 one of which is adjustable angularly around the axis of the wheels 41, 42. In this way, the arm 43 is rotated back and forth over an arc which is predetermined by the position of the adjustable stop.

During the movement of the arm 43 in the counter-clockwise direction, a pawl 48 pivoted at its end engages a 4 lobed star wheel 49 and rotates it through 90°. On passing this same position in the clockwise direction the pawl 48 moves back about its pivot and slides past the star wheel 49 without rotating it.

The star wheel 49 is rigidly mounted on a shaft 50 which is thus intermittently rotated step by step in one direction (as shown, clockwise) moving through 90° at each step.

Rigidly mounted on the shaft 50 and spaced apart on it are two cams 51. Each cam 51 has two lobes at 180° apart and each cam is set at 190° relative to the other so that lobes are at 90° intervals.

Pivotally suspended from a shaft 52 are two pendulum striker arms 53, each arm 53 being in proximity to one of the cams 51. A pin 54 on the arm engages the edge of the cam.

As the shaft 50 rotates through 90°, one of the cams 51 deflects its pendulum arm 53. Just before the end of the 90° movement (when the cam comes to rest), the pendulum is released and swings back past its normal rest position. During this swing, an arm 55 projecting from the arm 53 engages a lever arm 56 and moves it to close a micro-switch 57. The lever arm 56 is flexible and resilient so that the switch 57 is maintained closed for a short period long enough to operate the solenoid starter switch of an electric motor. The pendulum 53 ultimately returns to its normal rest position and the micro-switch 57 is released to the open position.

Upon the next movement of the shaft 50 through 90°, the other pendulum is deflected in a similar way and the other micro-switch is operated to select a second starter switch and cause its operation.

The operating arm 43 is preferably arranged to operate the star wheel 49 at about 45° from the vertical centre line to enable the pendulums to hang clear of the driving mechanism between the clock 1 and the timing mechanism.

It will be understood that the invention is not restricted to the details of the preferred forms described by way of example which may be modified without departure from the broad ideas underlying them.

In particular, any suitable form of timing mechanism may be used in association with the switch mechanism so as to select and control electrical circuits at predetermined intervals of which the length can be varied at will.

What we claim is:

1. Means for periodically selecting an electrical circuit and subsequently controlling the condition of that circuit, comprising at least two switches, each of said switches controlling an electrical circuit, a rotatable shaft, timing means connected to said shaft to rotate it intermittently step-by-step in one direction, and means operable at successive operations of said shaft to operate said switches successively and including pendulum arms, and means operated on rotation of said shaft to swing said arms successively into contact with said switches.

2. Means for periodically selecting and controlling an electrical circuit according to claim 1 having cam means on said shaft to deflect said pendulum arms outwardly and then to allow them to swing past their normal rest position on rotation of said shaft and lever arms operating said switches and contacted by said arms during their swing past the rest position, said lever arms being flexible whereby said switches are maintained operative for a short time interval.

3. Means for selecting and controlling either of two electrical circuits at periodic intervals of variable predetermined length, comprising two pairs of switches, one pair of switches being operable to select a circuit and the other switch of each pair being operable to control the selected circuit, means for operating said pairs of switches alternately comprising a member tiltable in one direction to operate the switches of one pair and in the other direction to operate the switches of the other pair, and means for tilting said member successively in opposite directions and including a shaft, step-by-step mechanism for intermittently rotating said shaft and timing means engaged with said step-by-step mechanism at variable predetermined intervals.

4. Means for selecting and controlling either of two electrical circuits at periodical intervals of variable predetermined length according to claim 3 in which the switches of each pair comprise contacts at each end of said tilting member, channels in said tilting member between said contacts and balls running in said channels and engaging the contacts at each end of said channels.

5. Means for selecting and controlling either of two electrical circuits at periodical intervals of variable predetermined length, comprising a rotatable shaft, step-by-step mechanism for rotating said shaft intermittently in one direction, timing means engaged with and driving said step-by-step mechanism at variable predetermined intervals, cams spaced along the shaft and angularly displaced relatively to one another by the angle through which the shaft rotates at each step, pendulum arms engaged by said cams, switches operated by contact of said pendulum arms, said cams moving said pendulum arms away from said switches on rotation of said shaft and allowing said pendulum arms to swing into contact with and operate said switches as said shaft comes to rest.

6. Means for selecting and controlling either of two electrical circuits at periodical intervals of variable predetermined length according to claim 5, comprising levers operating said switches, said levers being flexible so that said switches are maintained operated sufficiently long to operate a solenoid starter switch or the like.

7. Timing mechanism for use in means for periodically selecting and controlling an electrical circuit, comprising a switch operating arm, a unidirectionally rotating shaft, a differential mechanism between said shaft and said cam through which said shaft rotates said arm in one direction, said differential mechanism including a carrier, a first means operable on engagement by said arm to lock the arm to the carrier and reverse the direction of rotation of said arm, a second means operable on engagement by said arm during rotation in said reverse direction to free the arm from said carrier and again reverse its direction of rotation, a switch operated by said arm during its movement between said first and second means and means for varying the relative angular displacement of said first and second means whereby the number of revolutions of said shaft between successive operations of said switch is varied.

8. Timing mechanism for use in means for periodically selecting and controlling an electrical circuit, comprising a switch operating arm, a unidirectionally rotating shaft, a differential mechanism including two sun wheels and a carrier, said arm being fixed to one of said sun wheels and said shaft being in driving connection with the other of said sun wheels, means for holding said carrier frictionally against rotation, a first stop, a second stop displaced angularly relative to said first stop, means for varying the angular displacement between said stops, means carried by the switch arm operable on engagement with said first stop to lock said carrier to a sun wheel and cause said differential to rotate as a whole driving said arm in one direction and further means carried by the arm operable on engagement with said second stop to free the carrier from the sun wheel whereby the operating arm is rotated in the reverse direction.

9. Means for periodically selecting an electrical circuit and subsequently controlling the condition of that circuit, comprising at least two switches, each of said switches controlling an electrical circuit, a rotatable shaft, a star wheel on said shaft, an arm, means for driving said arm alternately clockwise and counterclockwise, said arm engaging said star wheel to rotate said shaft during movement in one of said directions to vary the angle through which said arm moves between successive reversals of direction of rotation whereby the time between successive engagements of said arm with said star wheel is varied, and means operable at successive operations of said shaft to operate said switches successively.

References Cited in the file of this patent

UNITED STATES PATENTS

| | | |
|---|---|---|
| 441,973 | Rapieff | Dec. 2, 1890 |
| 1,701,398 | Vickery | Feb. 5, 1929 |
| 1,701,399 | Vickery | Feb. 5, 1929 |
| 1,906,943 | Fisher | May 2, 1933 |
| 1,962,391 | Graseby | June 12, 1934 |
| 2,090,619 | Biach et al. | Aug. 24, 1937 |
| 2,254,509 | Bassett | Sept. 2, 1941 |

FOREIGN PATENTS

| | | |
|---|---|---|
| 520,644 | Germany | Mar. 12, 1931 |
| 611,747 | Germany | Apr. 5, 1939 |
| 671,568 | Great Britain | May 7, 1952 |
| 741,745 | France | Feb. 18, 1933 |